United States Patent [19]

Jefferson

[11] Patent Number: 5,642,161
[45] Date of Patent: Jun. 24, 1997

[54] COLOUR MONITORING APPARATUS

[76] Inventor: Peter D. Jefferson, 25 Trefoil Road, Wandsworth, London, United Kingdom, SW18 3EG

[21] Appl. No.: 589,344

[22] Filed: Jan. 22, 1996

[30] Foreign Application Priority Data

Jul. 22, 1993 [GB] United Kingdom .................. 9315216
Feb. 8, 1994 [GB] United Kingdom .................. 9402359

[51] Int. Cl.$^6$ .................................................. H04N 17/02
[52] U.S. Cl. ........................ 348/186; 348/659; 345/154
[58] Field of Search .............................. 348/181, 182, 348/184, 186, 187, 659, 660, 29, 30; 345/153, 154; 324/404; H04N 17/02, 11/20

[56] References Cited

U.S. PATENT DOCUMENTS

| 3,614,304 | 10/1971 | Schonfelder | 178/5.4 |
| 3,850,412 | 11/1974 | Olson | 358/10 |
| 4,051,520 | 9/1977 | Davidse et al. | 358/22 |
| 4,488,168 | 12/1984 | Mino | 348/186 |
| 4,843,599 | 6/1989 | Bucker | 345/154 |
| 4,875,089 | 10/1989 | Judge | 358/10 |
| 4,891,689 | 1/1990 | Senda et al. | 348/659 |
| 5,235,413 | 8/1993 | Knierim | 348/659 |
| 5,548,331 | 8/1996 | Kawahara et al. | 348/186 |

OTHER PUBLICATIONS

Matney et al, "Determining Valid Component Analog Video Signals with a 3-D Vector Representation", SMPTE Journal, vol. 95, No. 5, May 30, 1986, pp. 550–556.
Matney et al, "Determining Valid Component Analog Video Signals with a 3-D Vector Representation", SMPTE Journal, vol. 95, No. 5, 30 May 1986, Scarsdale, NY, pp. 550–556.
Noah, "Preventing Illegal Colors with the Diamond Display", Tektronix, Copyright 1994, pp. 1–8.

Primary Examiner—John K. Peng
Assistant Examiner—Jeffrey S. Murrell
Attorney, Agent, or Firm—Nixon & Vanderhye, P.C.

[57] ABSTRACT

Color monitoring apparatus has similarities to conventional vectorscope but utilizes unique color difference signals which are luminance independent. Linear combinations of ratios between R, G and B differences produce a display which maps color one-to-one to the plane of the display.

15 Claims, 3 Drawing Sheets

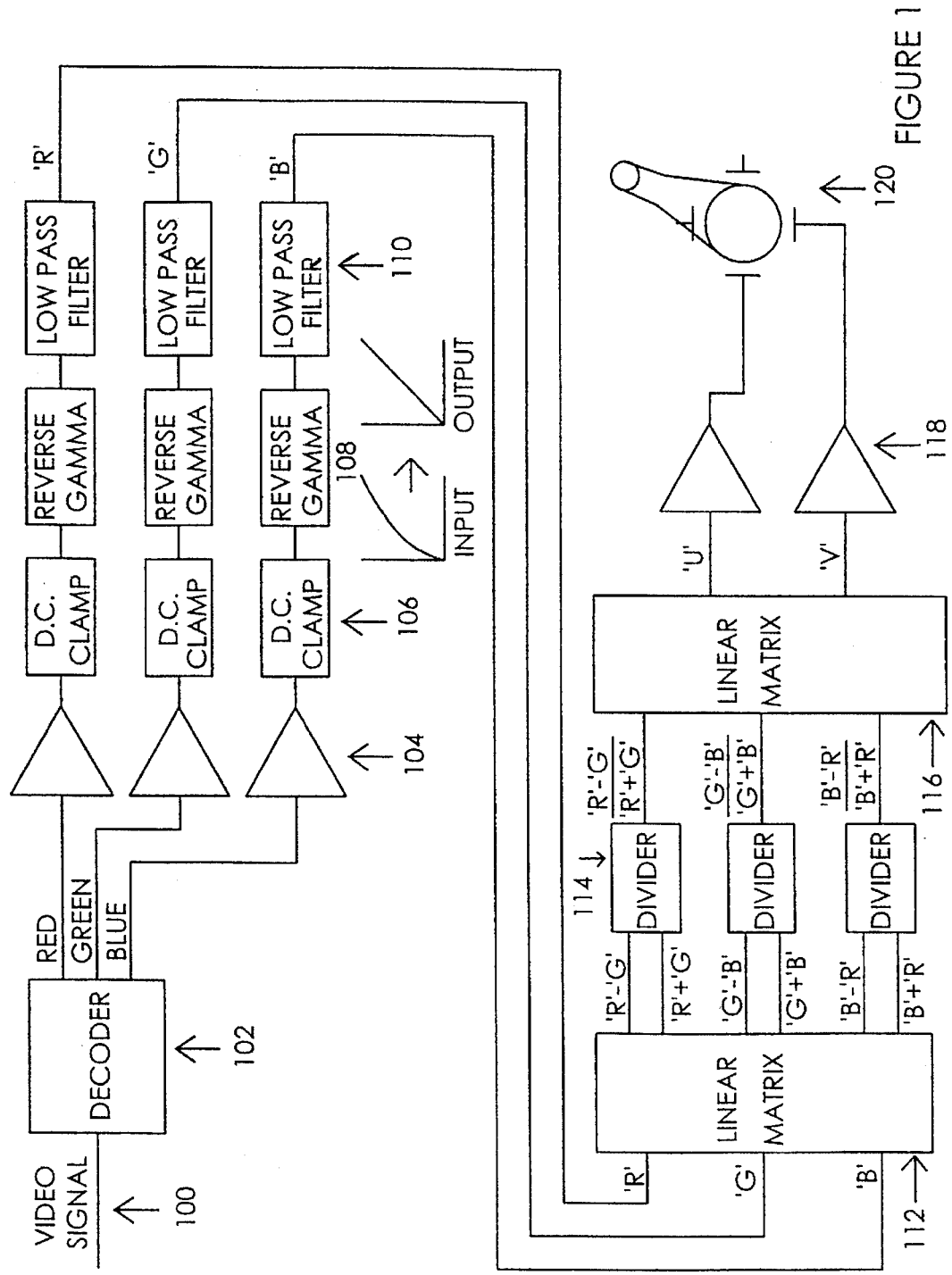

COLOUR MONITORING APPARATUS

The present patent application is a Continuation-in-Part of International Patent Application No. PCT/GB94/01590, filed 22nd Jul. 1994, having the title "Colour Monitoring Apparatus".

This invention relates to colour monitoring apparatus for use with video signals. One important application lies in television measuring equipment.

When two or more video signals are instantaneously combined to form a single video signal, as for example in a vision mixer, it is a requirement for the signals to be synchronous. This means that the field pulses which drive the vertical scan circuits of the TV or other display device, the line drive pulses which drive the horizontal scan circuits and the colour reference subcarrier burst (for PAL or NTSC) of the incoming video signals have to arrive at the mixing hardware at the same time.

To ensure this is the case for line and field pulses, a waveform monitor is locked to a reference pulse source. The relative timing of the video sources can be compared either to the reference or to each other, and adjusted accordingly. To check the timing of the subcarrier reference burst, a piece of equipment known as a vectorscope is used and this works in a different way. Because the two colour signals R–Y and B–Y are quadrature modulated on the subcarrier, a two dimensional display can be produced on an oscilloscope by driving its X and Y deflection plates with two signals derived from two synchronous demodulators with a common and variable phase reference and ninety degree phase separation. These two signals consist of proportions of the colour difference signals R–Y and B–Y and produce a display which—for a test signal such as colour bars which consist of the maximum saturation of six colours—appears as six spots at the corners of an irregular hexagon. In strict fact, this is only the case for NTSC; for PAL, because one colour difference signal is inverted on alternate lines, two hexagons are produced, one a mirror image of the other. As the phase of the reference to the demodulators is varied relative to the subcarrier phase of the input video signal, the display rotates and very accurate measurements of subcarrier phases can be made.

It has previously been recognised that the vectorscope is useful for other measurements such as chroma gain calibration and various measurements in the vision control/lighting area. Because the colours contained within the video signal are visible on a two-dimensional display, it is possible to see graphically the effects of various adjustments to the camera controls, lighting and so on. However, the usefulness of the equipment in this area is limited because of various imperfections in the form of the display.

It is an object of this invention to provide improved apparatus capable of deriving a display which is not subject to the imperfections of the known vectorscope.

Accordingly, the present invention consists, in one aspect, in colour monitoring apparatus for use with video signals, comprising means for developing two colour difference signals and a two-dimensional display driven by said colour difference signals as orthogonal coordinates, characterised in that the colour difference signals are luminance independent.

The present invention will now be described by way of example with reference to the accompanying drawings in which:

FIG. 1 is a block diagram of colour monitoring apparatus according to the present invention;

Figure 2A:
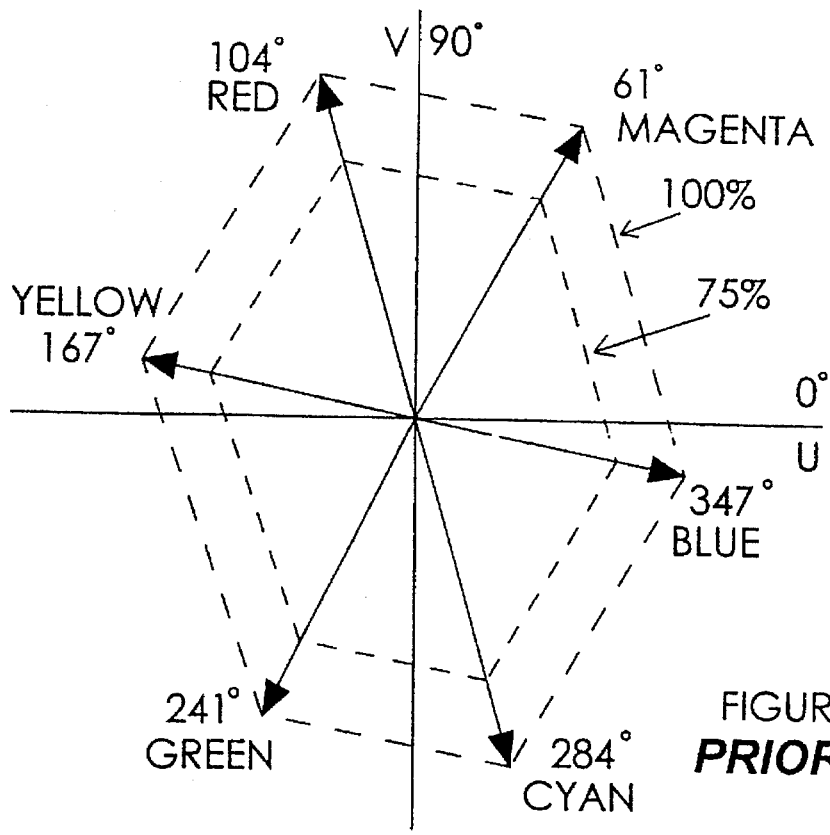
FIGS. 2A and 2B are representations of the display provided by, respectively, the known vectorscope and the apparatus of FIG. 1.

Referring to FIG. 1, the video signal at input terminal 100 is decoded at block 102 into component form. The component signals are taken through separate R, G and B channels each comprising, in series, an input amplifier 104, a DC clamp 106, a reverse gamma corrector 108 and a low-pass filter 110. Because gamma correction is introduced in the camera to compensate for the non-linearity of the television tube, it is necessary for the apparatus in this embodiment to apply reverse gamma correction so as to produce modified R, G and B signals which are proportional to the light entering the camera. References in what follows to R, G and B signals should be construed accordingly. After reverse gamma correction, the signals are low-pass filtered to about 1.5 MHz to remove noise and high frequency detail.

The R, G and B signals pass to a linear matrix 112 which develops difference signals:

R–G R+G G–B G+B B–R B+R

Pairs of difference signals are passed to one of three dividers 114 to produce the three ratios:

$$\frac{R-G}{R+G} \quad \frac{G-B}{G+B} \quad \frac{B-R}{B+R}$$

When the R+G, G+B or B+R signals approach zero, for example at black, the outputs of the dividers 114 will tend towards infinity. The dividers have their own output limiters to prevent "latch-up" but will still produce a noisy display at low luminance levels. A variable "black clip" circuit can accordingly be applied to the R+G, G+B and B+R signals to produce a small offset from zero at low signal levels to limit the gain of the dividers and so reduce the noise. It is also possible to "Z-modulate" the display, that is to say turn off the spot at very low luminance levels.

The three ratios from the dividers 114 are taken to a further linear matrix 116 which develops colour difference signals V* and U* as follows:

$$V^* = \frac{R-G}{R+G} \cos 15 - \frac{G-B}{G+B} \cos 75 - \frac{B-R}{B+R} \cos 45$$

$$U^* = \frac{R-G}{R+G} \cos 75 - \frac{G-B}{G+B} \cos 15 + \frac{B-R}{B+R} \cos 45$$

The colour difference signals are passed through respective output amplifiers 118—which have variable gain and DC offset—to drive X and Y plates of an oscilloscope display shown schematically at 120.

The display produced by the described apparatus has a number of important advantages over the use of conventional equipment in this area. Thus, the display produced by the V* and U* signals does not rotate, that is to say a red signal always plots at the top and slightly to the left. The display forms a regular hexagon, in contrast to the irregular display of the conventional equipment which arises from the difference weighting factors applied to the R–Y and B–Y signals. Most importantly, the position on the display at which a particular coloured object will appear will not depend on its luminance but only on the ratio between the R, G and B signals. For example, for 100% colour bars the display of the conventional equipment will produce an (irregular) hexagonal or double hexagonal pattern with the six or twelve dots failing at calibration positions corresponding to full saturation. In this respect, the apparatus according to the present invention operates the same. When 75% colour bars are applied to the conventional vectorscope, the display changes as a result of the change in luminance. With the apparatus according to the present invention, however, the display remains unchanged to reflect the fact that there has been no change in the colour information. Because of this inherent linear characteristic, any non-linearity created by a camera or other imaging device or by the lighting arrangement, will be immediately and clearly evident as a "smearing" of the display. This makes the apparatus a very powerful tool in checking camera line-up and in setting lights.

The form of display that can be produced using apparatus according to the present invention is contrasted in FIG. 2 with the display available with a conventional vectorscope when used to monitor colour. It will be seen that the vectorscope display shown in FIG. 2A produces, for 100% colour bars, an irregular hexagon. If the luminance is varied, say to 75%, the display is as shown reduced in size. In other words, there is no one-to-one mapping of colour onto the plane of the display.

Figure 2B:
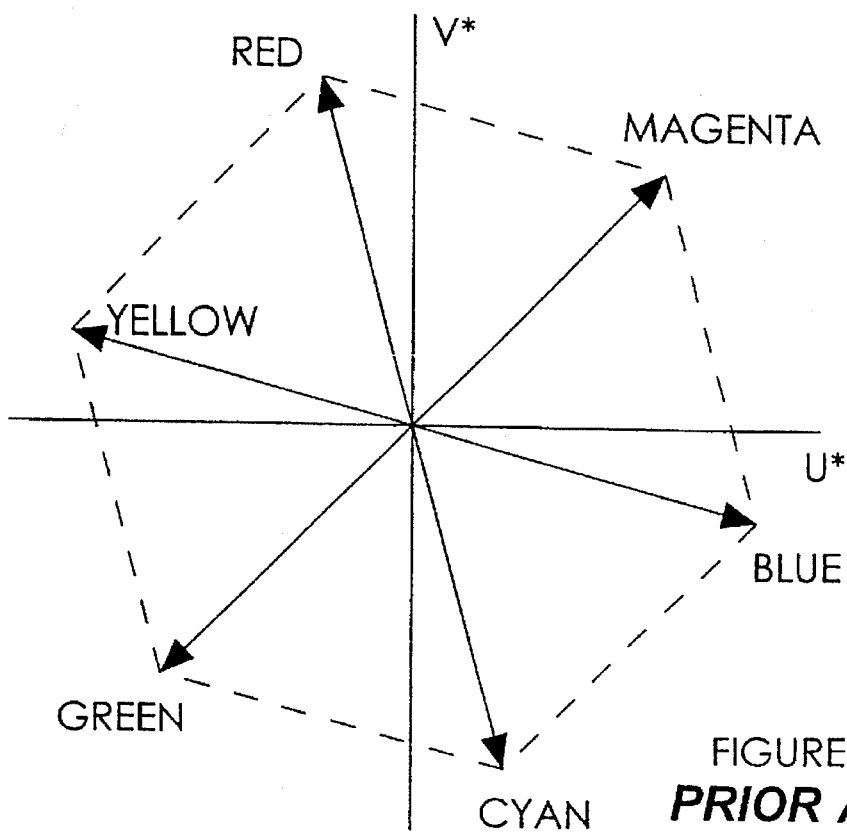

In contrast, the display produced in accordance with the present invention and shown at FIG. 2B, produces a regular hexagon which does not change in size if there is a change of luminance leaving the R:G:B ratios intact. There is accordingly a one-to-one mapping of colour onto the plane of the display.

Figure 3:
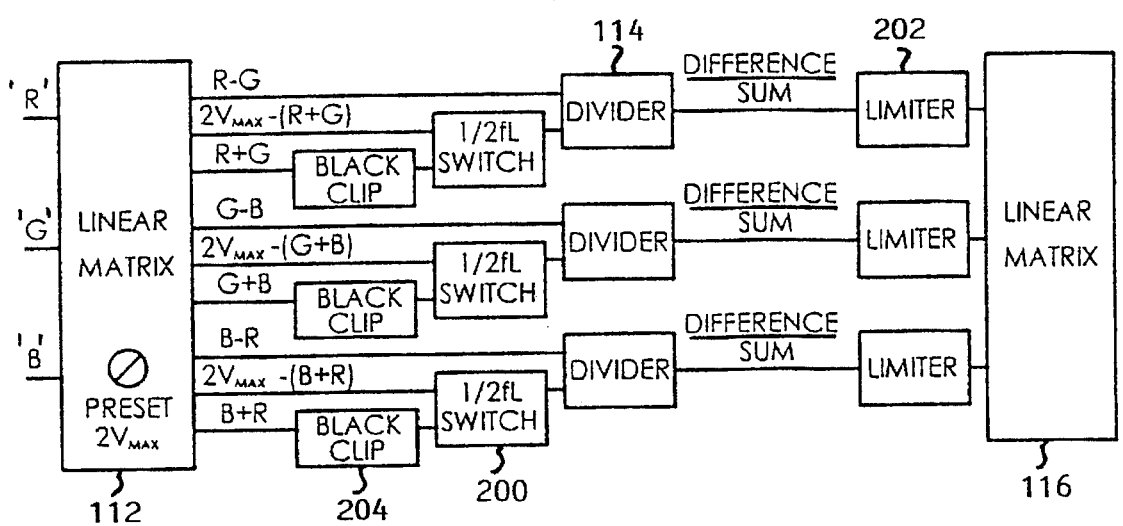
FIG. 3 is a diagram of a modification of the colour monitoring apparatus shown in FIG. 1.

A modification of the colour monitoring apparatus according to the present invention is now described with reference to FIG. 3. FIG. 3 shows that part of the block diagram shown in FIG. 1 between the linear matrix 112 and the further linear matrix 116. The dividers 114 are as shown in FIG. 1. Additional components are three half line frequency switches 200 and three limiters 202, each comprising a positive and a negative limiter. Further components, which may be provided in the embodiment shown in FIG. 1, are three black clip circuits 204.

In a first display mode, which can display the type of display described with reference to FIGS. 1 and 2, outputs of the linear matrix 112 are passed through their respective black clip circuits 204 to their respective half line frequency switches 200. In a second display mode, shortly to be described, outputs of the linear matrix 112 are passed directly to the respective half line frequency switches; the reverse gamma correctors 108 are not used in this mode.

The generation of a second display mode arises due to the discovery by the present inventor that, using the apparatus according to the present invention, the first display mode produced by the present invention can plot some invalid colours outside the hexagon, whenever one or two of the R, G or B components are below black, but not when all three are.

In order to rectify this problem, in the second display mode a waveform monitor (not shown) indicates when all three components are below black, and this property is used in the second display mode. The sums produced by the first linear matrix 112 are subtracted from a voltage of twice the maximum allowed (at this point in the circuit), and are substituted for the original summed signals by the half line frequency switches 200 to produce a superimposed dual section display which also shows the equivalent above 100% white signals. The reverse gamma correctors 108 and black clip circuits 204 are not used in this mode. Positive and negative limiters 202 are also included after the dividers 114 to keep the spot on the screen, and the two sections are made independently visible.

The "U" and "V" drive signals for the second display mode are as follows.

$$U \text{ DRIVE} = \frac{R-G}{2V_{MAX}-(R+G)} \cos 75 - \frac{G-B}{2V_{MAX}-(G+B)} \cos 15 + \frac{B-R}{2V_{MAX}-(B+R)} \cos 45$$

$$V \text{ DRIVE} = \frac{R-G}{2V_{MAX}-(R+G)} \cos 15 - \frac{G-B}{2V_{MAX}-(G+B)} \cos 75 - \frac{B-R}{2V_{MAX}-(B+R)} \cos 45$$

In practice, an accurate out of graticule indication is not necessarily easy to achieve, for two reasons. First, the transfer function requires X/O=zero rather than X/O=infinity. If digital processing is used this problem can be solved by forcing the outputs of the dividers 114 to zero when the denominators are zero. In the case, secondly, of basic analogue dividers one cannot even use negative denominators. In order to solve this problem, a small amount of preset lift is added, and the two Vmax is set slightly higher than the theoretical level. With analogue dividers available which are accurate over a range of 100X at 2 MHz, a detection accuracy of 2% is predicted for this simple analogue version.

The present invention will find application in fields outside the television studio. It will be noted, for example, that in combination with a video camera providing a video signal, it provides a useful tool for colour analysis in the laboratory or elsewhere.

It should be understood that this invention has been described by way of example only and a variety of modifications are possible without departing from the scope of the invention. Thus, whilst the described forms of the modified colour difference signals U* and V* produce a convenient display and are relatively easy to compute, alternatives will exist. Depending upon the working environment, analogue or digital implementations will be available.

The described apparatus of course differs fundamentally from a conventional vectorscope in that it displays demodulated signals and contains no phase information. Whilst in theory it would be possible to utilise the present invention with modulated signals, it would generally not be good practice to measure phase with the modified colour difference signals that the present invention relies upon. The advantages of the present invention over the conventional vectorscope accordingly lie in determining and monitoring amplitudes of colour signals rather than phase.

I claim:

1. Colour monitoring apparatus for use with video signals, comprising means for developing two colour difference signals and a two-dimensional display driven by said colour difference signals as orthogonal coordinates, wherein the colour difference signals are luminance independent.

2. Apparatus according to claim 1, wherein the colour difference signals comprise linear combinations of ratios of RGB component differences.

3. Apparatus according to claim 2, wherein the colour difference signals comprise linear combinations of ratios between the sum and the difference of two RGB components.

4. Apparatus according to claim 2, wherein the colour difference signals comprise respective different linear combinations of the same ratios of RGB component differences.

5. Apparatus according to claim 4, wherein the colour difference signals comprise respective different linear combinations of the ratios:

$$\frac{R-G}{R+G} \quad \frac{G-B}{G+B} \quad \frac{B-R}{B+R}.$$

6. Apparatus according to claim 1, wherein the colour difference signals are selected so as to produce a regular hexagonal display for a video signal containing colour bars.

7. Apparatus according to claim 1, further comprising RGB signal correction means serving to effect reverse gamma correction.

8. Colour monitoring apparatus for use with video signals, comprising means for electronically processing three colour dependent inputs to develop two colour difference signals and provide two drive signals for subsequent application to a two dimensional display driven by said colour difference signals as orthogonal co-ordinates, wherein the colour difference signals are derived by three separate division processes so as to produce a hexagonal display for a colour bar video test signal.

9. Apparatus according to claim 8, wherein the hexagonal display is a regular hexagonal display.

10. Apparatus according to claim 8, wherein the colour difference signals comprise linear combinations of ratios of RGB component differences.

11. Apparatus according to claim 10, wherein the colour difference signals comprise linear combinations of ratios between the sum and difference of two RGB components.

12. Apparatus according to claim 10, wherein the colour difference signals comprise respective different linear combinations of the same ratios of RGB component differences.

13. Apparatus according to claim 12, wherein the colour difference signals comprise respective different linear combinations of the ratios:

$$\frac{R-G}{R+G} \quad \frac{G-B}{G+B} \quad \frac{B-R}{B+R}.$$

14. Apparatus according to claim 8, further comprising RGB signal correction means serving to effect reverse gamma correction.

15. Apparatus according to claim 8, wherein the colour difference signals are luminance independent.

* * * * *